United States Patent [19]

Hyodo

[11] Patent Number: 4,890,137
[45] Date of Patent: Dec. 26, 1989

[54] IMAGE PROJECTION DEVICE FOR USE IN SLIT EXPOSURE OPTICAL SYSTEM

[75] Inventor: Haruhiko Hyodo, Osaka, Japan

[73] Assignee: Minolta Camera Kabushiki Kaisha, Osaka, Japan

[21] Appl. No.: 227,825

[22] Filed: Aug. 3, 1988

[30] Foreign Application Priority Data

Aug. 4, 1987 [JP] Japan ................................ 62-195538

[51] Int. Cl.$^4$ ...................... G03B 27/34; G03B 27/40; G03B 27/70
[52] U.S. Cl. ........................................ 355/57; 355/233
[58] Field of Search ....................... 355/49, 51, 55, 57, 355/60, 65, 66, 52, 233, 235, 71

[56] References Cited
U.S. PATENT DOCUMENTS 4,459,016  7/1984  Tokuhara ewt al. ................. 355/57

Primary Examiner—Richard A. Wintercorn
Attorney, Agent, or Firm—Price, Gess & Ubell

[57] ABSTRACT

An image projection device for use in a slit exposure type optical system, which has a projection lens cut horizontally at a position above the optical axis thereof and a holder which holds the projection lens at its lower circumferential portion. The slit exposure type optical system includes a transparent plate for supporting an original thereon, an illumination lamp for illuminating the original on the transparent plate from below, a first, second, third and fourth mirrors for transmitting a bundle of rays reflected from the original to a light receiving surface, and a slitted member for restricting the bundle of rays from the original to the light receiving surface. The projective lens can have a made compacter than when the circular lens is used and can be smaller eccentricity than when the lens is cut at its upper and lower portions.

4 Claims, 2 Drawing Sheets

IMAGE PROJECTION DEVICE FOR USE IN SLIT EXPOSURE OPTICAL SYSTEM

FIELD OF INVENTION

The present invention relates to improvements in image projection devices for use in slit exposure type optical systems, and more particularly to an image projection device of reduced size.

BACKGROUND OF THE INVENTION

In recent years, it has been strongly required to make copying machines small-sized and accordingly to provide compacter image projection devices including a projection lens. FIGS. 1 and 2 show an image projection device already proposed to meet this requirement for use in slit exposure type optical systems. The proposed device has a striplike projection lens having upper and lower cut portions in corresponding relation to the width of the slit and are thereby made small-sized, and a frame H for holding the projection lens L (see, for example, Unexamined Japanese Patent Publication SHO 61-87125).

However, it is extremely difficult to hold such a striplike projection lens in position without eccentricity. Stated more specifically, FIG. 3 shows a component lens L1 having a diameter d1 and held by a lens barrel H having curved surfaces R1 and R2. In this case, the lens barrel H has an inside diameter d2 which is greater than the diameter d1 of the lens L1. The lens L1 indicated in solid line is likely to be displaced to the broken-line position shown. Assuming that the upper and lower cut portions of the lens L1 have an opening angle of $2\theta$, the translational eccentricity $\Delta h$ then involved is expressed by the following equation.

$$\Delta h = \left(\frac{d2 - d1}{2}\right)/\cos\theta$$

Now suppose the lens is 40 mm in diameter d1, the fitting tolerance thereof is 0 to $-0.03$ mm, the lens barrel is 40 mm in diameter d2 and the fitting tolerance thereof is $+0.025$ to 0 mm. The translational eccentricity $\Delta h$ is 0.039 when 8 is 45 degrees or 0.055 when $\theta$ is 60 degrees. If the lens is in the usual circular form, the translational eccentricity $\Delta h$ is expressed by $(d2 - d1)/2$ and is therefore 0.028. Thus, the lens L1 having the upper and lower cut portions is about 1.4 times as great as the usual circular lens in translational eccentricity at $\theta = 45$ degrees or is about twice as great at $\theta = 60$ degrees.

The eccentricity of the projection lens adversely affects the image forming performance thereof and consequently poses a serious problem. Especially, if the projection lens for copying machines has a small number of component lenses and a wide field angle and is therefore narrow in the allowable range of eccentricities, such that a slight eccentricity impairs the image forming performance.

SUMMARY OF THE INVENTION

Accordingly, the main object of the present invention is to provide an image projection device which is made compact and assured of satisfactory image forming performance for use in slit exposure type optical systems.

The above object can be fulfilled by an image projection device for use in slit exposure type optical systems which comprises a projection lens cut horizontally at a position above the optical axis thereof, and a holder holding the projection lens at its lower circumferential portion.

BRIEF DESCRIPTION OF THE DRAWINGS

These and other objects or features of the present invention will become apparent from the following description of a preferred embodiment thereof taken in conjunction with t drawings, in which.

In the following description, like parts are designated by like reference numbers throughout the several drawings.

DESCRIPTION OF THE PREFERRED EMBODIMENT

An embodiment of the invention will be described below.

Figure 1:
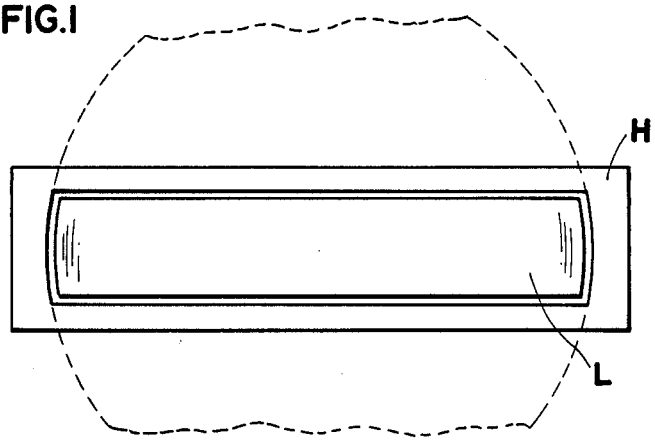
FIGS. 1 and 2 are a front view and a side elevation, respectively, showing a known image projection device.
Figure 2:
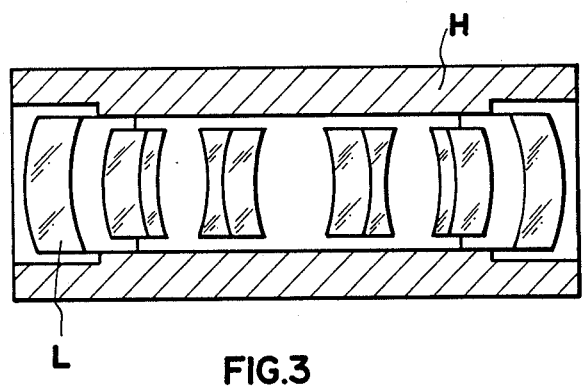
Figure 3:
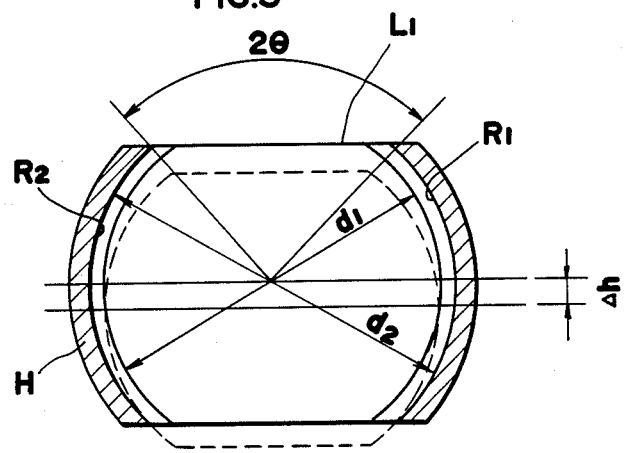
FIG. 3 front view for illustrating an eccentricity error in the image projection device shown in FIGS. 1 and 2.
Figure 4:
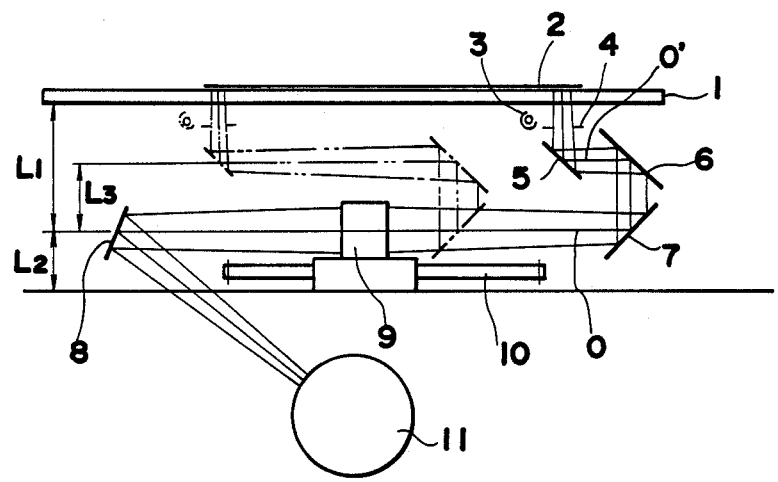
FIG. 4 is a side elevation showing the optical system of a slit exposure type copying machine to which the invention is applied.

FIG. 4 is a side elevation showing the optical system of a slit exposure type copying machine. An original 2 placed on a transparent glass plate 1 is illuminated with an illumination lamp 3 from below. The bundle of rays reflected from the original 2 is restricted by a slitted member 4 and guide onto a photosensitive drum 11 by mirrors 5, 6, 7, a projection lens 9 and a mirror 8. The original 2 is scanned by moving a first optical system including the illumination lamp 3, slitted member 4 and mirror 5, and a second optical system including the mirrors 6, 7 at a velocity ratio of 2:1 from solid-line position to broken-line position. The mirror 6 is at an angle of 45 degrees with the mirror 7, and the optical axis 0 between the mirrors 7, 8 is substantially parallel to the optical axis 0' between the mirrors 5, 6. The projection lens 9 is movable along a guide bar 10 in the direction of the axis 0 for giving varying magnifications. To correct the conjugate length as the projection lens 9 is moved to give an altered magnification, the mirror 8 is also movable in the axial direction and is positioned at an adjustable angle.

With the optical system described, the distance L3 from the optical axis 0 between the mirrors 7, 8 to the optical axis 0' between the mirrors 5, 6 is so determined that the top of the projection lens 9 will not block the bundle of rays between the mirrors 5, 6. Accordingly, it is important to cut off an upper portion of the projection lens 9 in order to decrease the distance L1 from the optical axis 0 of the projection lens 9 to the glass plate 1 thereabove. On the other hand, it is impossible to greatly decrease the height L2 of the present device under the optical axis 0 of the lens 9 since the mechanism for moving the projection lens 9, the guide bar 10, etc. are arranged. Accordingly, even if a lower portion of the lens 9 is cut off, the device can not be made very compact.

According to the embodiment of the invention based on the principle described above, an upper portion only of the projection lens is cut off to compact the device, and the lens is supported at its circumferential lower portion so as not to impair the image forming performance thereof.

Figure 5:
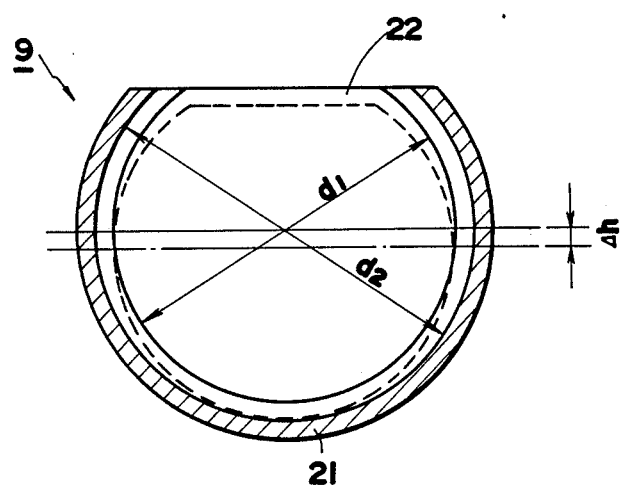
FIG. 5 is a front view showing an image projection device embodying the invention.

More specifically, when the projection lens 9 comprises a lens barrel 21 and a component lens 22 as shown in FIG. 5, the lens 22, having a diameter d1, is horizontally cut at a position above its optical axis a1 and is supported by the lens barrel 21 at the lower side of the lens 22 where the circumferential portion thereof remains uncut. The maximum eccentricity $\Delta h$ of the component lens 22 thus constructed is not greater than $(d2-d1)/2$ as is the case with usual circular lenses.

With the construction of the present embodiment, therefore, the image projection lens can be made compacter than when only a completely circular lens is used and can be smaller in eccentricity than when the lens is cut off at its upper and lower portions.

The present lens is also diminished in tilting eccentricity as in the case of circular lenses and is minimized in the impairment of its performance. Like usual circular lenses, the present lens is usable free of problems insofar as eccentricity errors are within a range considered when designing the lens.

Although the present invention has been fully described by way of example with reference to the accompanying drawings, it is to be noted that various changes and modifications will be apparent to those skilled in the art. Therefore, unless otherwise such changes and modifications depart from the scope of the invention, they should be construed as being included therein.

What is claimed is:

1. In a copying machine of a compact configuration for reproducing copies of an original having a slit exposure system with a folded optical axis between the platen for supporting the original and the photosensitive member, the improvement comprising:
   an optical projection lens having along a major portion of its perimeter a continuous curving edge and along a minor portion of its perimeter a straight, flat edge chord forming equal angles with the optical axis of the lens and each end of the chord, and
   a holder member contacting the projection lens at positions along the continuous curving edge, whereby mounting eccentricities effecting the optical performance are minimized.

2. The copying machine of claim 1 wherein the holder member is approximately semicircular.

3. The copying machine of claim 2 wherein the holder member only contacts the lens along the curving edge.

4. In a copying machine of a compact configuration for reproducing copies of an original having a slit exposure system with a folded optical axis between the platen for supporting the original and the photosensitive member, the improvement comprising:
   an optical projection lens consisting of an improved perimeter having along a major portion of its perimeter a continuous curving edge and along a minor portion of its perimeter a straight, flat edge chord forming equal angles with the optical axis of the lens and each end of the chord, and
   a holder member contacting the projection lens only at positions along the continuous curving edge, whereby mounting eccentricities effecting the optical performance are minimized.

* * * * *